(12) United States Patent
Wicker et al.

(10) Patent No.: US 10,963,375 B1
(45) Date of Patent: Mar. 30, 2021

(54) MANAGING MAINTENANCE OPERATIONS FOR A DISTRIBUTED SYSTEM

(71) Applicant: Amazon Technologies, Inc., Seattle, WA (US)

(72) Inventors: Gary Wicker, Bainbridge Island, WA (US); David Craig Yanacek, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 310 days.

(21) Appl. No.: 15/934,821

(22) Filed: Mar. 23, 2018

(51) Int. Cl.
*G06F 12/02* (2006.01)
*G06F 9/50* (2006.01)

(52) U.S. Cl.
CPC .......... *G06F 12/0253* (2013.01); *G06F 9/505* (2013.01)

(58) Field of Classification Search
CPC ..... G06F 9/505; G06F 9/5083; G06F 12/0253
USPC .......................................................... 707/813
See application file for complete search history.

(56) References Cited

U.S. PATENT DOCUMENTS

| | | | | |
|---|---|---|---|---|
| 7,143,151 B1 * | 11/2006 | Kayashima | ......... | H04L 41/0806 709/223 |
| 8,185,654 B2 * | 5/2012 | Degenaro | ............. | G06F 9/5083 709/238 |
| 8,467,351 B2 * | 6/2013 | Liu | ....................... | H04W 36/30 370/332 |
| 8,745,425 B2 * | 6/2014 | Kameda | ................ | G06F 9/5088 713/320 |
| 9,235,609 B1 * | 1/2016 | Pandey | ................. | G06F 16/219 |
| 9,304,815 B1 * | 4/2016 | Vasanth | ............... | G06F 11/006 |
| 9,344,492 B1 * | 5/2016 | Dantkale | ............. | G06F 12/0223 |
| 9,378,135 B2 * | 6/2016 | Bennett | ................... | G06F 12/06 |
| 9,432,305 B1 * | 8/2016 | Das | ..................... | H04L 61/1511 |
| 9,471,331 B2 * | 10/2016 | Kludy | ................. | G06F 11/0793 |
| 9,519,696 B1 * | 12/2016 | Roth | ..................... | G06F 16/258 |
| 9,559,900 B1 * | 1/2017 | Morley | .............. | H04L 41/0806 |
| 9,569,634 B1 * | 2/2017 | Yanacek | ............. | G06F 21/6218 |
| 9,697,226 B1 * | 7/2017 | Youngworth | ......... | G06F 3/0655 |
| 9,703,814 B1 * | 7/2017 | Shams | ................. | G06F 16/273 |
| 9,817,703 B1 * | 11/2017 | Ryland | ..................... | G06F 9/52 |
| 9,880,870 B1 * | 1/2018 | Danilov | ............. | G06F 9/45558 |
| 10,474,656 B1 * | 11/2019 | Bronnikov | ............ | G06F 16/217 |
| 10,552,058 B1 * | 2/2020 | Jadon | .................... | G06F 3/0655 |
| 10,642,748 B1 * | 5/2020 | Lercari | ............... | G06F 12/1009 |
| 2004/0267916 A1 * | 12/2004 | Chambliss | .......... | H04L 41/5038 709/223 |
| 2005/0071842 A1 * | 3/2005 | Shastry | ................ | G06F 9/5038 718/100 |

(Continued)

*Primary Examiner* — Hanh B Thai
(74) *Attorney, Agent, or Firm* — Davis Wright Tremaine LLP

(57) ABSTRACT

A technology is provided for managing maintenance operations in a distributed system. Maintenance operations of a plurality of hosts may be tracked in a service provider environment via a maintenance management service. The plurality of hosts are queried to determine availability of each of the plurality of hosts. A schedule for the maintenance operations of the plurality of hosts may be generated based at least in part on the availability of the plurality of hosts and a policy that manages when hosts are allowed to perform maintenance operations. Instructions from the maintenance management service may be sent to the plurality of hosts to schedule the maintenance operations of the plurality of hosts using the schedule.

20 Claims, 10 Drawing Sheets

(56) References Cited

U.S. PATENT DOCUMENTS

| | | | |
|---|---|---|---|
| 2006/0229896 A1* | 10/2006 | Rosen | G06Q 10/1053 705/321 |
| 2009/0089793 A1* | 4/2009 | Nandagopal | H04W 8/12 718/105 |
| 2010/0036956 A1* | 2/2010 | Nishikawa | G06F 9/505 709/226 |
| 2010/0274885 A1* | 10/2010 | Yoo | H04L 67/1008 709/224 |
| 2011/0252254 A1* | 10/2011 | Kameda | G06F 9/5088 713/320 |
| 2012/0005404 A1* | 1/2012 | Raz | G06F 12/0246 711/103 |
| 2012/0314569 A1* | 12/2012 | Liu | H04W 36/30 370/230 |
| 2013/0007282 A1* | 1/2013 | Davis | G06F 9/5083 709/226 |
| 2013/0111467 A1* | 5/2013 | Sundararaj | G06F 9/505 717/176 |
| 2013/0117741 A1* | 5/2013 | Prabhakaran | G06F 11/1484 718/1 |
| 2014/0108775 A1* | 4/2014 | Kludy | G06F 11/0706 713/2 |
| 2014/0215129 A1* | 7/2014 | Kuzmin | G06F 12/0246 711/103 |
| 2014/0344312 A1* | 11/2014 | Yanacek | G06F 16/21 707/804 |
| 2014/0365664 A1* | 12/2014 | Yeow | G06F 11/2041 709/226 |
| 2014/0365719 A1* | 12/2014 | Kuzmin | G06F 12/0246 711/103 |
| 2014/0380402 A1* | 12/2014 | Roth | G06F 21/64 726/1 |
| 2015/0100630 A1* | 4/2015 | Xiao | G06F 9/505 709/203 |
| 2016/0029278 A1* | 1/2016 | Poikonen | H04W 36/12 370/331 |
| 2016/0037421 A1* | 2/2016 | Jokinen | H04W 36/12 455/436 |
| 2016/0085643 A1* | 3/2016 | McAlister | H04L 41/0668 714/4.12 |
| 2016/0283421 A1* | 9/2016 | Wilson | G06F 9/45558 |
| 2016/0292249 A1* | 10/2016 | Vasanth | G06F 9/4881 |
| 2016/0373373 A1* | 12/2016 | Das | H04L 61/1511 |
| 2017/0026230 A1* | 1/2017 | Kludy | G06F 9/4416 |
| 2017/0141958 A1* | 5/2017 | Morley | H04L 41/0806 |
| 2017/0171182 A1* | 6/2017 | Yanacek | H04L 63/08 |
| 2017/0279855 A1* | 9/2017 | Roth | G06F 21/33 |
| 2017/0308559 A1* | 10/2017 | Shams | G06F 16/273 |
| 2018/0341413 A1* | 11/2018 | Lai | G06F 3/0647 |

* cited by examiner

500

```
┌─────────────────────────────────────────────────────────────┐
│ Tracking service availability of a plurality of hosts in a  │
│ service provider environment via a load balancer, wherein a │ — 510
│ host is not available during garbage collection operations. │
└─────────────────────────────────────────────────────────────┘
                              ↓
┌─────────────────────────────────────────────────────────────┐
│ Creating a schedule for the garbage collection operations   │
│ for the plurality of hosts based on a policy that defines a │
│ predetermined amount of the plurality of hosts to be        │ — 520
│ allowed to perform the garbage collection operations during │
│ a time period.                                              │
└─────────────────────────────────────────────────────────────┘
                              ↓
┌─────────────────────────────────────────────────────────────┐
│ Sending scheduling instructions from the load balancer to   │
│ the plurality of hosts for directing the garbage collection │ — 530
│ operations of the plurality of host.                        │
└─────────────────────────────────────────────────────────────┘
                              ↓
┌─────────────────────────────────────────────────────────────┐
│ Withholding requests at the load balancer that are directed │
│ to a host to perform additional work during a period of time│ — 540
│ that the host is scheduled to perform the garbage           │
│ collection operations.                                      │
└─────────────────────────────────────────────────────────────┘
```

FIG. 5

MANAGING MAINTENANCE OPERATIONS FOR A DISTRIBUTED SYSTEM

BACKGROUND

Electronic devices and computing systems have become ever-present in many aspects of society. Devices may be found in the workplace, at home, or at school. Computing systems may include computing and data storage systems to process and store data. Some computing systems have begun offering centralized, virtual computing services known as service provider environments that may reduce overall computing costs, improve availability, improve scalability, and reduce time to deploy new applications. An architecture for a centralized virtualized system may be described as a distributed web service.

The distributed web service may service clients that submit requests to the distributed web service to be performed. The clients may occasionally experience latency in the requests being performed by the distributed web service. The latency may be caused by any number of factors. The latency may be referred to as network latency and causes unexpected delays in the amount of time for the requests or tasks to be completed.

BRIEF DESCRIPTION OF THE DRAWINGS

FIGS. 5 and 6 are flowcharts of example methods for managing tasks according to an example of the present technology.

DETAILED DESCRIPTION

Figure 1A:
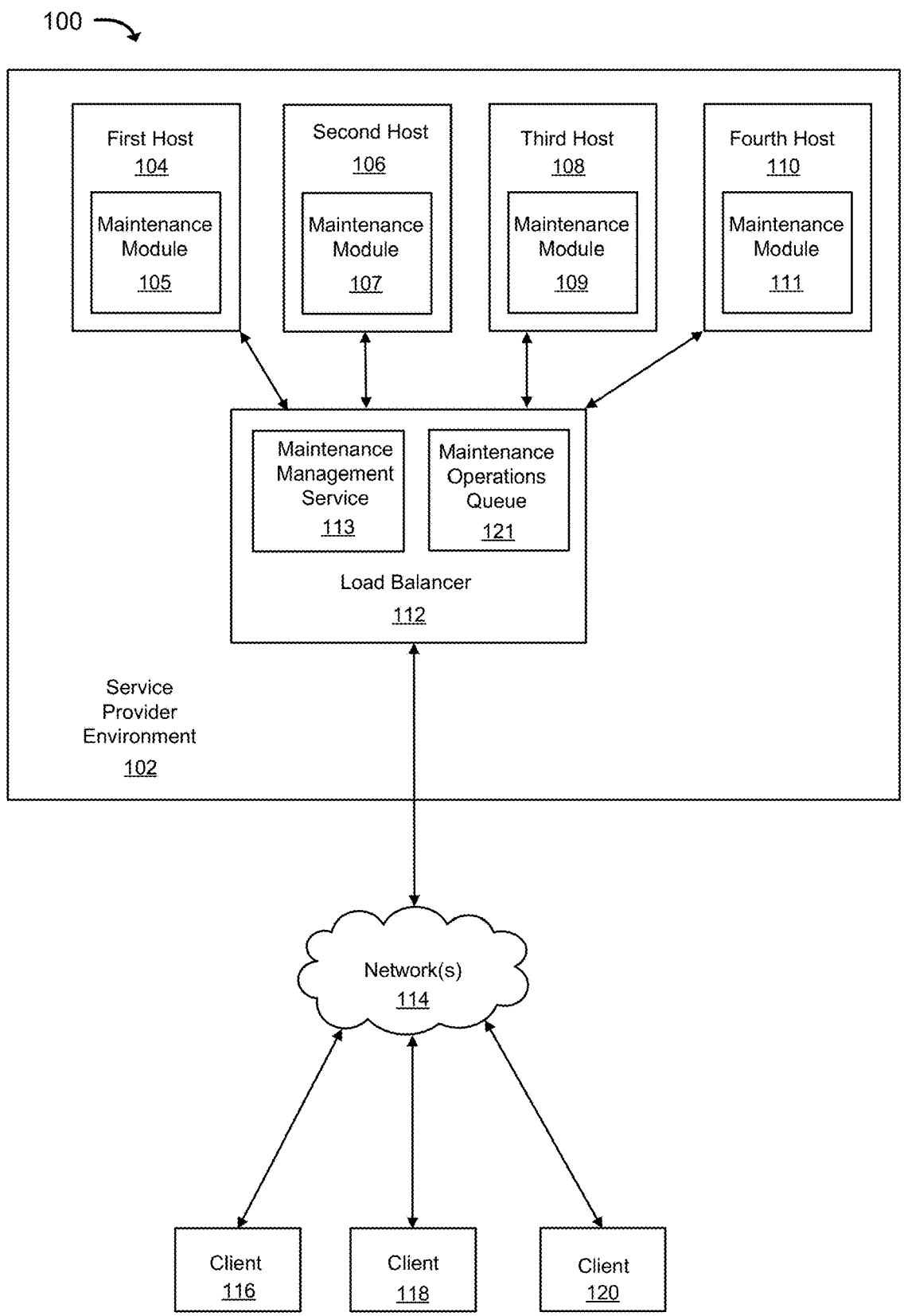
FIGS. 1A-D are block diagrams illustrating systems for managing and scheduling maintenance operations for a distributed system according to an example of the present technology.

Technologies may be provided that employ a maintenance management service to schedule maintenance operations for a distributed system. The maintenance management service may be logic added to a load balancer or the maintenance management service may be independent from a load balancer. The distributed system may be described as distributed web services which may be available to customers. The distributed system may employ a load balancer to dispatch incoming client requests to a plurality of hosts (e.g., computing instances or servers), and the hosts may process the requests and supply a response to the request. The hosts may perform periodic maintenance operations, such as a garbage collection as a form of automatic memory management. The maintenance operations may cause the hosts or software executing on the hosts to execute slower or pause. This slower execution or any pauses may cause latency in the distributed system in responding to or completing the incoming client requests. The timing and duration of the maintenance operations may be difficult to predict which may result in the distributed system being less predictable and deterministic.

The described technology may manage maintenance operations, such as garbage collection, a cooperative distributed scheduling effort to reduce latency in the distributed system. Maintenance operations may be, but are not limited to, garbage collection, clean-up operations, back up operations, data store cleanup operations (e.g., tombstone operations), logging operations, debugging operations, and restarting of a computing instance or a physical host of a computing instance. In one example aspect, the maintenance management service may track the maintenance operations of a plurality of hosts that are associated with the load balancer. The maintenance management service may query the plurality of hosts to determine the availability of each of the hosts. The querying may be considered a health check. The maintenance management service may then generate a schedule based at least in part on the availability of the plurality of hosts and based at least in part on a policy to direct the maintenance operations of the hosts. For example, the maintenance management service may instruct an identified host to perform a maintenance operation during a certain time period. At the end of the time period, the identified host is to stop performing the maintenance operation and come back online to service client requests.

In another example, a host may ask the maintenance management service for permission to go offline to perform maintenance operations. The maintenance management service may permit or deny the request. In one case, the maintenance management service may permit the request for a designated period of time to perform maintenance (e.g., immediately or at a scheduled time). Accordingly, the load balancer may withhold requests from clients being assigned to a host while the host is performing maintenance operations. If the maintenance management service denies the request, the client may be configured to make a request at a later time or the maintenance management service may instruct the client when to make the request again.

In one aspect, the maintenance management service may be employed to track scheduling information from hosts about when the hosts perform maintenance operations, but the maintenance management service may not generate a schedule or direct the timing of the maintenance operations. Instead the scheduling information may be distributed from the load balancer to each of the hosts for the hosts to make determinations about when to perform maintenance operations. Thus, each host may make an informed decision about when to perform maintenance operations based at least in part on when the other hosts are not performing maintenance operations. This may cause a reduction in latency in the distributed system. In one aspect, the host may employ peer-to-peer communications to communicate with one another about when maintenance operations are being performed or scheduled to be performed.

This technology proposes an improved way to manage maintenance operations in a distributed system. For example, rather than making maintenance operations the exclusive domain of a single computing instance on a single host, the technology makes the scheduling of maintenance operations into a cooperative distributed effort. This may be accomplished by making changes to the operations of the hosts and/or the load balancer.

FIG. 1A illustrates a block diagram for an environment 100 which depicts a distributed system for managing maintenance operations. The environment 100 comprises a service provider environment 102, and the service provider environment 102 may include a plurality of computing systems or services employed to provide virtualized computing services accessible to devices, applications, or other services via a network 114 (e.g., the internet). The service provider environment 102 may receive and forward service requests from a client 116 for work to be performed by components of the service provider environment 102. For example, an application executing on the client 116 may request an operation be performed by a first host 104 where the operation requires processing by the first host 104. The service provider environment 102 may receive requests from a plurality of clients 116, 118, and 120. The architecture of the service provider environment 102 may include a load balancer 112. The service requests from the clients may be received at the service provider environment 102 and the requests may be sent to the load balancer 112.

The load balancer 112 may dispatch incoming client requests to a fleet of hosts, and the load balancer 112 may be an application load balancer or a network load balancer. For example, the service provider environment 102 is depicted as including the first host 104, a second host 106, a third host 108, and a fourth host 110. The hosts may be referred to as a host or server that is capable of servicing requests from the clients. The hosts may refer to computing instances or virtual machines in the service provider environment 102. The computing instance may be executing on one of the hosts. It should be appreciated that the present technology may be applied to computing instances or physical servers. After the load balancer 112 assigns a service request from a client to a host, the host may then process the service requests and respond to the clients with a reply.

Software that is executing on the first host 104, as well as the other hosts, may process client requests and may be implemented to automatically perform maintenance operations. This may occur using a maintenance module in each of the hosts. The first host 104, the second host 106, the third host 108, and the fourth host 110, are depicted as comprising maintenance modules 105, 107, 109, 111. For example, the services or application on the host may be implemented in a language with automatic garbage collection (e.g. Java, JavaScript/Node.js). When a maintenance module performs a maintenance operation, such as garbage collection, the host may go offline or otherwise be largely unavailable to serve requests from clients (e.g., a significant majority of the hosts computing resources may be dedicated to the garbage collection). Software implemented in a host that performs automatic garbage collection may introduce variability in the amount of time used for the host to compute and send responses to client requests. In a distributed system, as is depicted by environment 100, more than one host may perform maintenance operations at the same time. This may cause latency in the distributed system in responding to the requests from the clients, especially where a significant number of hosts are not available.

It should be appreciated that maintenance operations may be any type of maintenance operations including but not limited to garbage collection, clean-up operations, back up operations, data store clean-up operations (e.g., tombstone operations), and restarting of a virtual machine or a physical host of a virtual machine. Garbage collection may be a form of automatic memory management. For example, garbage collection can be described as attempts to reclaim garbage, or memory occupied by objects that are no longer in use by a program executing on a machine or virtual machine. Logging operations may include data logs that are generated on the host that are compressed and sent over a network for long term storage. This may be described as offloading data logs and may cause latency when a host is simultaneously offloading data logs and responding to requests from clients via a load balancer. De-bugging operations may include de-bugging operations performed at a host that may be performed to identify and remove errors. Tombstone operations may be described as data store cleanup or data store housekeeping. The tombstone operations may be cleaning or removing the tombstones out of a database that represent deleted records, rows, or key-value pairs. The maintenance operations may also be periodic operations performed at a host that may cause latency in responding to requests received from clients via a load balancer.

Additionally, garbage collection events can cause software execution for services or applications on the hosts to pause, and while these events are usually brief, the pausing events can sometimes last for seconds. The pausing events may occur at any time (i.e., unexpectedly), making performance of the distributed system difficult to predict. From the client's perspective, these events may produce occasional latency outliers, with the rate of these outliers being proportional to the fleet size of the distributed system and frequency of garbage collections. The present technology may provide a cooperative and distributed effort to manage and schedule maintenance operations to reduce latency in the distributed system.

In one aspect, the load balancer 112 includes a maintenance management service 113. The maintenance management service 113 may be employed to schedule and control maintenance operations for the maintenance modules 105, 107, 109, 111. During a time period that the host is performing the maintenance operations, the load balancer 112 may not send service requests to the host or may send a reduced number of service requests to the host. The load balancer 112 may be in communication with the maintenance management service 113 to determine when to withhold service requests from a host. In one configuration, the host may complete any pending service requests before performing the maintenance operations. The host may simultaneously service any pending service requests that have already been assigned to the host while performing the maintenance operations.

Software that is executing on a host may have built in functionality that allows commands to be received from a management entity or management node such as the load balancer 112 regarding when to perform maintenance operations. The built in functionality may be part of the maintenance module. As a result, functionality may be added to a maintenance module for a host to allow maintenance operations for the maintenance module to be controlled by an entity such as the load balancer 112 or the maintenance management service 113.

In one configuration, the maintenance management service 113 may track when the hosts are performing maintenance operations. Using the tracked maintenance information, the maintenance management service 113 may generate a schedule indicating when a host is allowed to perform a maintenance operation. The schedule may be held in a maintenance operations queue 121. The schedule may be a queue that describes a sequence or order in which the hosts are to perform maintenance operations. In one example, the maintenance management service 113 may calendar or schedule a time slot for each of the hosts to perform maintenance operations. For example, each host may be designated or assigned a 30 minute time slot in a 4 hour period or a 12 hour period in which they are allowed to perform maintenance operations. The host may not be allowed to perform maintenance operations outside of that time slot unless the host has explicit permission from the maintenance management service 113.

In one aspect, the maintenance management service 113 may not generate a schedule but may still control whether or not a host is allowed to perform maintenance operations at a given time. The host may request permission from the maintenance management service 113 before the host performs maintenance operations. In response, the maintenance management service 113 may give permission for the host to perform maintenance operations for a period of time (e.g. 15 minutes). The host may come back online and begin receiving new service requests after the time period has ended even if the maintenance operations have not been completed. Alternatively, the maintenance management service 113 may deny permission for the host to perform maintenance operations or may initially deny permission and schedule a future time for the host to perform the maintenance operations.

In one aspect, the load balancer 112 may continue to assign new service requests to a host while the host is performing maintenance operations. In such a scenario, the load balancer 112 may assign a reduced workload or fractional workload to the host that is performing maintenance operations, as compared to the workload that would be assigned to the host where the host was not performing maintenance operations.

In one aspect, the maintenance management service 113 may give or deny permission to a host's request to perform maintenance operations based at least in part on a policy of how many hosts are able to perform maintenance operations at the same time. For example, the policy may mandate that only one host in a distributed system is allowed to perform maintenance operations at any given time. The number of instances allowed to perform maintenance may change based at least in part on the number of hosts in the distributed system. For example, two or three hosts may be allowed to perform maintenance operations at the same time. Alternatively, the policy may be a percentage, such as ten percent, meaning that ten percent or less of the hosts are allowed to perform maintenance operations at the same time. In one aspect, the maintenance management service 113 may give permission for a host to perform maintenance operations but then based at least in part on a need in the distributed system, the maintenance management service 113 may send a message to the host to stop performing maintenance operations and come back online to take new service requests from the load balancer 112.

In one aspect, the maintenance management service 113 may track the maintenance operations of the hosts by sending health checks, ping messages, or a query to determine the health of each of the hosts. If a host responds to the query then the host may be considered healthy and the load balancer 112 may keep the host in rotation for sending service requests to. If a host fails to respond to the query then the load balancer 112 may consider the host unhealthy and may no longer send service requests to the host.

The maintenance management service 113 may be able to receive additional messages from the hosts in response to the queries. For example, the maintenance management service 113 may be able to receive messages from the hosts in response to the queries such as "Temporarily Unavailable" or "Available." In response to receiving a "Temporarily Unavailable" message from a host, the maintenance management service 113 may reply to the host with an affirmative message. The "Temporarily Unavailable" message may indicate to the maintenance management service 113 that the host is performing maintenance operations and the load balancer 112 may not send new service requests to the host until the host sends an "Available" message to the maintenance management service 113.

In one aspect, the maintenance operation for a host is to restart the host. A restart operation may be used in place of garbage collection or another maintenance operation. For example, during a "Temporarily Unavailable" period for the second host 106, the second host 106 may be performing a restart operation that restarts the computing instances, virtualized software, applications, services or other software associated with the second host 106. A host or a computing instance may be executing software that cannot be modified to support an entity such as the maintenance management service 113 or the load balancer 112 controlling the maintenance operations of the host because of inherent limitations of the software. For such a host, the host may run for a period of time without performing maintenance operations. The maintenance management service 113 may be capable of commanding the software or the host to not perform maintenance operations. During this period of time, memory utilization increases for the host, but before the memory utilization is exhausted the host will restart. The restart may be controlled by the load balancer 112 or the maintenance management service 113.

Figure 1B:
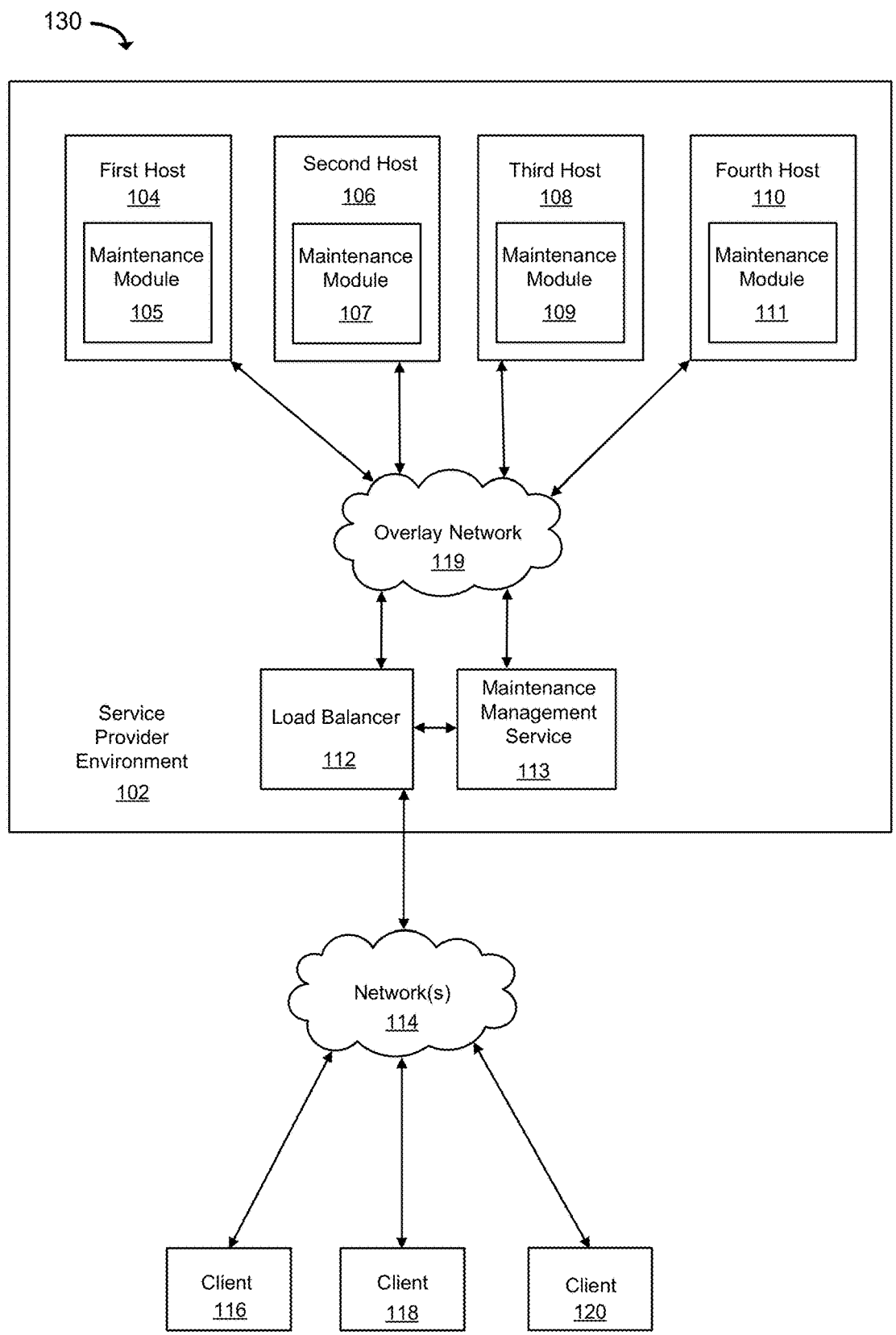

FIG. 1B illustrates a block diagram for an environment 130 which depicts a distributed system for managing maintenance operations. The environment 130 depicts the maintenance management service 113 as separate from the load balancer 112. For example, the maintenance management service 113 may not be contained within the load balancer 112 and may be an independent service. The load balancer 112 and the maintenance management service 113 may or may not be hosted by the same host in the service provider environment 102. The load balancer 112 and the maintenance management service 113 in environment 130 may be in communication with one another for the purposes of scheduling and managing maintenance operations.

The environment 130 may include an overlay network 119. The overlay network 119 may be a virtualized network that is executing on a physical network within the service provider environment 102 that allows the components or nodes within the service provider environment 102 to communicate with one another. For example, the first host 104, the second host 106, the third host 108, and the fourth host 110 may each communicate with the load balancer 112 or the maintenance management service 113 through the overlay network 119 as depicted.

Figure 1C:
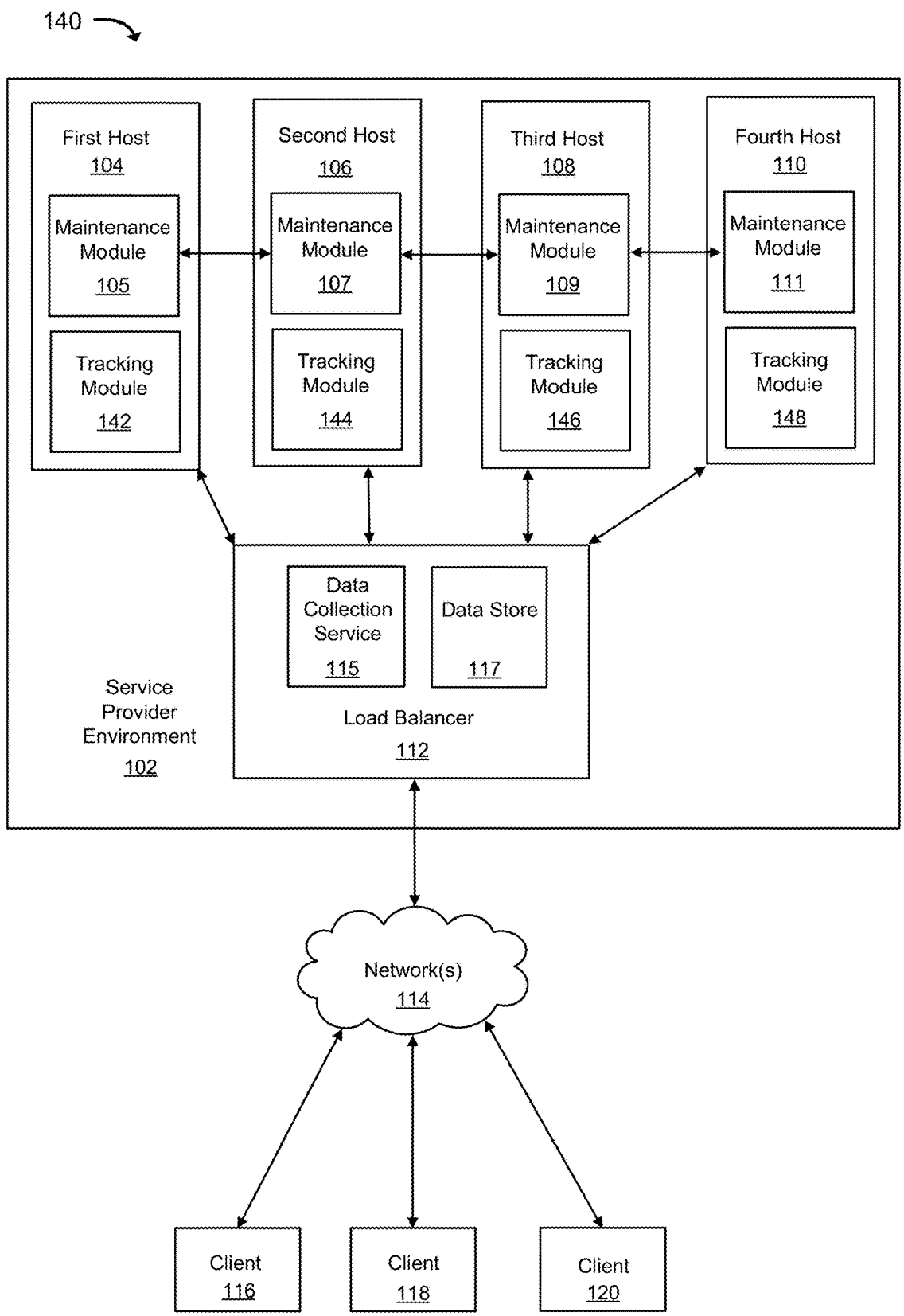

FIG. 1C illustrates a block diagram for an environment 140 which depicts a distributed system for managing maintenance operations. The environment 130 depicts the load balancer 112 as including a data collection service 115 and a data store 117.

In one aspect, the load balancer 112 may track information via the data collection service 115 regarding which hosts are performing maintenance operations. However, the load balancer 112 may not be configured to control, give permission, or generate a schedule for when hosts are to perform maintenance operations. The tracking information collected by the data collection service 115 may be stored in the data store 117. In such an embodiment, the load balancer 112 may share or provide the tracking information to each of the hosts. Each of the hosts may then determine when to perform maintenance operations based the tracking information. The tracking information may be updated on an ongoing basis (e.g., every few second, minutes or hours, etc.). The tracking information may be periodically pushed to the hosts or a host may pull or request the tracking information from the data store 117. For example, the first host 104 may determine that maintenance operations need to be performed at the first host 104. The first host 104 may then request the current tracking information from the data collection service 115 or the data store 117. The maintenance module 105 associated with the first host 104 may then determine whether to perform the maintenance operations based on how many other hosts are currently performing maintenance operations. The maintenance module 105 may make such a determination based on a policy that determines how many hosts are allowed to perform maintenance operations at the same time. The policy may be employed by each of the hosts in the distributed system and may be provided by the load balancer 112. Thus, the present technology may enable the hosts to take turns performing maintenance operations, such that latency in the distributed system is reduced.

The first host 104, the second host 106, the third host 108, and the fourth host 110, are depicted as comprising tracking modules 142, 144, 146, and 148. In one example, the tracking information may be generated by the tracking modules 142, 144, 146, and 148, such as the tracking module 1144 associated with the second host 106. As a result, the maintenance module 107 may set an initial schedule (e.g., a tentative schedule) for the second host 106 to perform maintenance operations. The schedule information may be shared with the data collection service 115. After the maintenance module 107 ingests tracking information from the data store 117 regarding a schedule of maintenance operations for other hosts in the distributed system, the maintenance module 107 may revise the schedule of maintenance operations for the second host 106 to avoid performing maintenance operations at the same time as the other hosts.

Figure 1D:
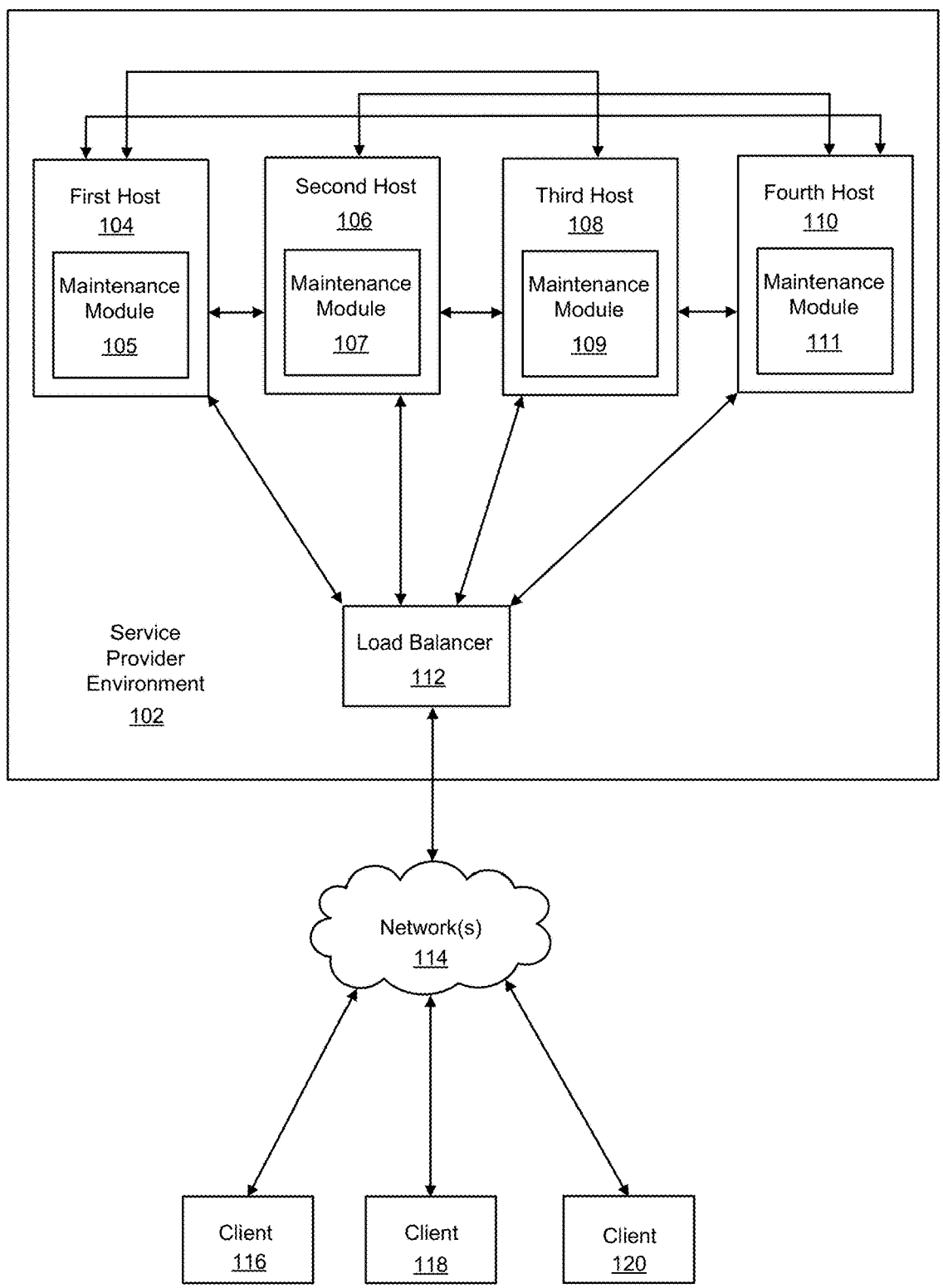

FIG. 1D illustrates a block diagram for an environment 150 which depicts a distributed system for managing maintenance operations. In one aspect, the hosts may be in communication with each of the other hosts, as depicted, using a peer-to-peer protocol. The peer-to-peer communications may enable the hosts or the maintenance module of each host to provide information to one another about when each host is performing maintenance operations. This may enable the maintenance module of each host to make determinations about when to perform maintenance operations based on policy and without the load balancer 112 centrally tracking maintenance operations for each of the hosts.

Figure 2:
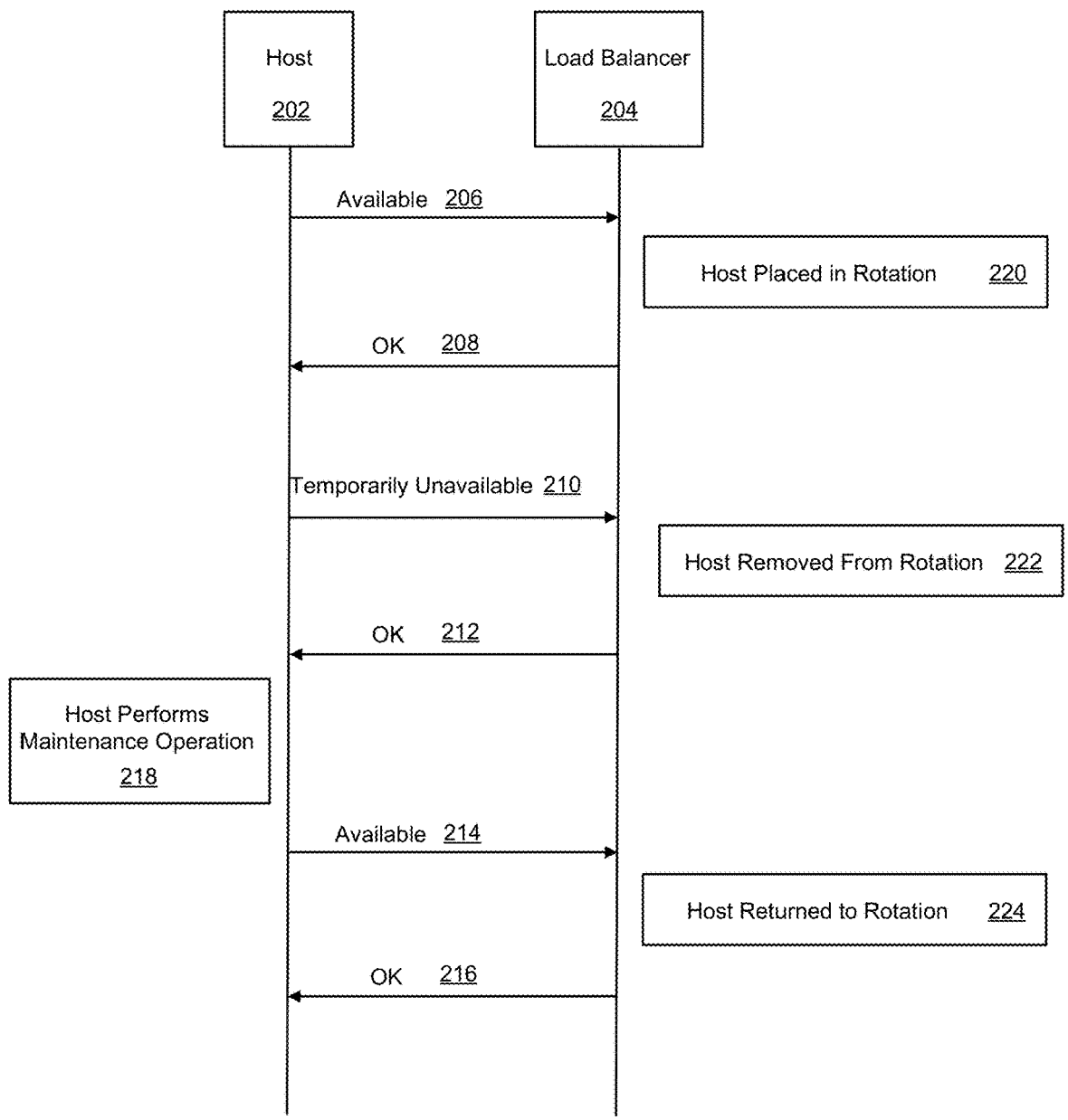
FIG. 2 is an end-to-end flow diagram for managing and scheduling maintenance operations for a distributed system according to an example of the present technology.

FIG. 2 is an end-to-end flow diagram illustrating a method 200 which is an example of reducing latency in a distributed system by managing or scheduling maintenance operations of a host 202. The host 202 may be a physical host, a server, or a virtual machine such as a computing instance. This method 200 is described according to an example of the present technology from a service provider environment point of view. The functionality of the method may be implemented and executed as instructions on a machine, where the instructions are included on at least one computer readable medium or one non-transitory machine-readable storage medium. The method may be carried out via the host 202 and the load balancer 204. The host 202 may have all the same features and capabilities of the hosts described in FIG. 1. The load balancer 204 may have all the same features and capabilities of the load balancer 112 in FIG. 1.

The host 202 may send messages regarding the availability of the host 202 to the load balancer 204. For example, the host 202 sends an available 206 message to the load balancer 204. In response, the load balancer 204 may place the host 202 in rotation 220 to receive new service requests from clients. The load balancer 204 may also send an OK 208 message back to the host 202. Alternatively, the host 202 may send a temporarily unavailable 210 message to the load balancer 204. In response, the load balancer 204 may remove the host 202 from rotation 222 such that the host 202 does not receive new service requests while the host 202 is temporarily unavailable. The load balancer 204 may also send an OK 212 message back to the host 202.

While the host 202 is temporarily unavailable, the host 202 may perform maintenance operations 218. After the maintenance operations have been performed, the host 202 may send an available 214 message to the load balancer 204. In response the load balancer 204 may return the host 202 to rotation 224 to receive new service requests. The load balancer 204 may also send an OK 216 message back to the host 202.

Figure 3:
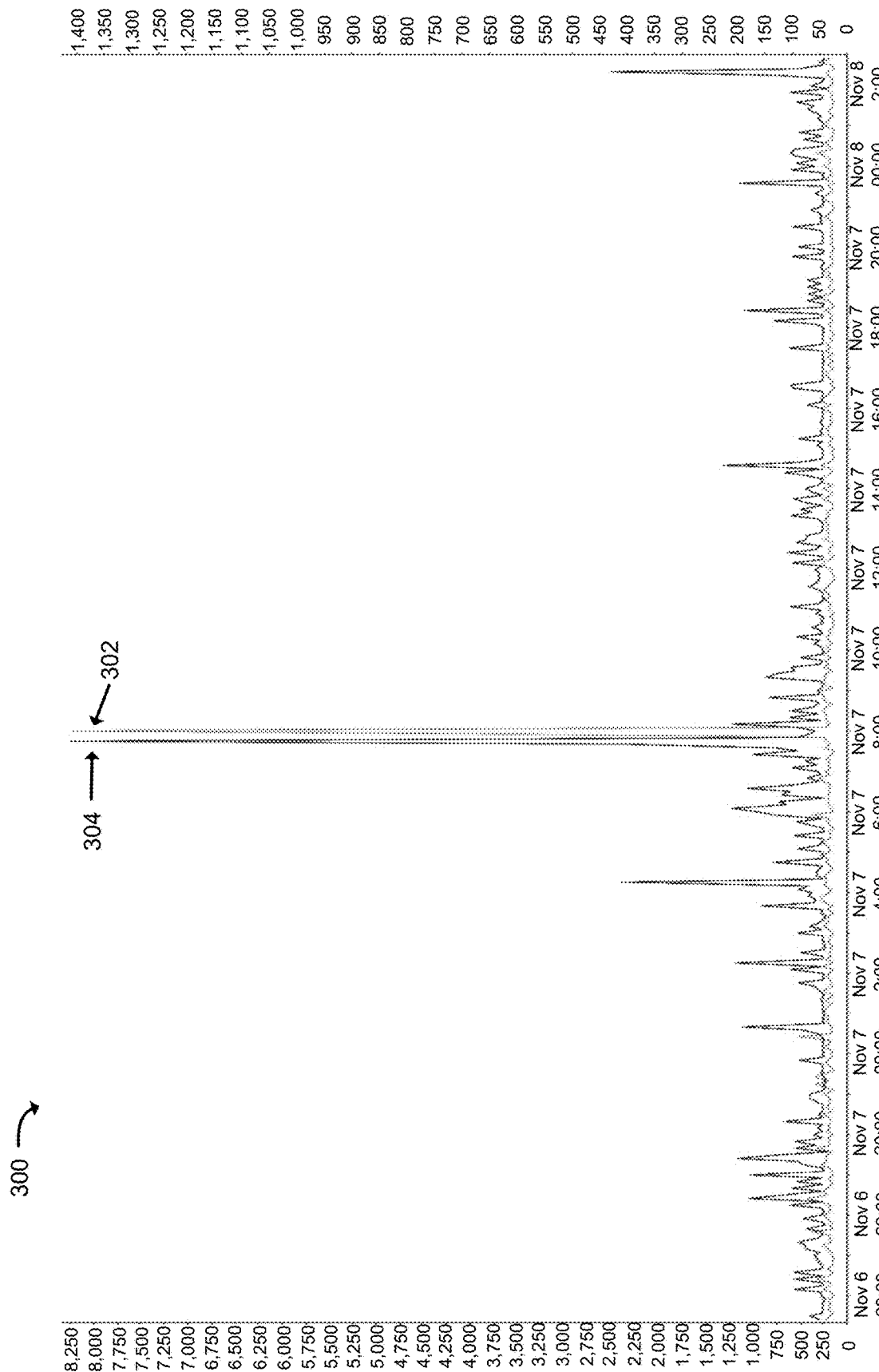
FIG. 3 is a graph depicting latency due to garbage collection.

FIG. 3 is a graph 300 that depicts latency in a distributed system due to maintenance operations being performed in an unscheduled, uncontrolled, and uncooperative manner. Specifically, graph 300 depicts latency for garbage collection operations in a distributed system. Peak 302 represents a peak or a spike in the latency at a specific time in the distributed system. Peak 304 represents a peak or a spike in the garbage collection operations of the components in the distributed system. As can be seen, there is a correlation to spike in the latency of the distributed system that is based on a spike in the garbage collection operations occurring in the distributed system. The present technology seeks to cooperatively manage maintenance operations such that spikes in the latency of the distributed system, such as peak 302, will be avoided or minimized.

Figure 4:
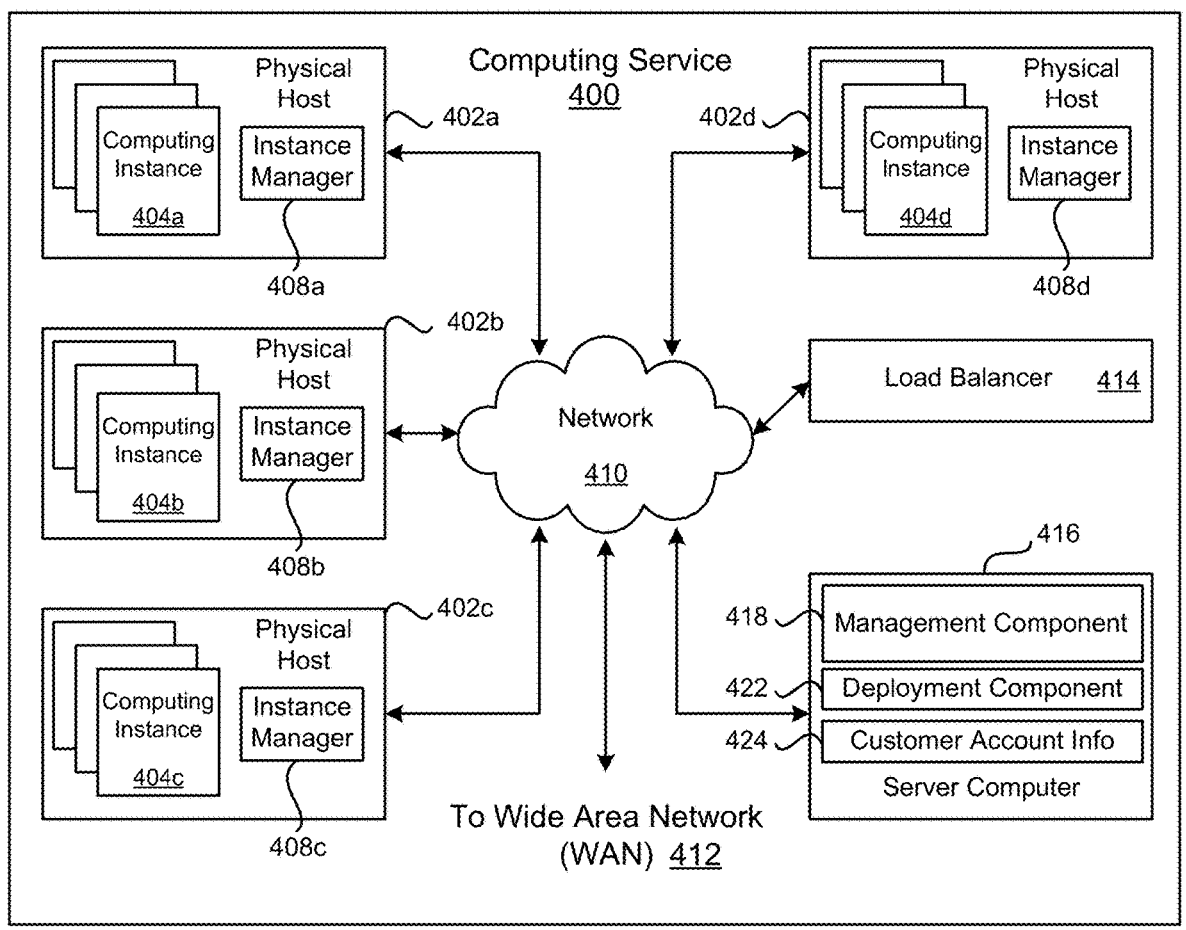
FIG. 4 is a block diagram that illustrates an example computing service environment according to an example of the present technology.

FIG. 4 is a block diagram illustrating an example computing service 400 that may be used to execute software services in a computing service environment or service provider environment. In particular, the computing service 400 depicted illustrates one environment in which the technology described herein may be used. The computing service 400 may be one type of environment that includes various virtualized service resources that may be used, for instance, to host computing instances 404a-d on which a computing service may execute.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked client devices, such as desktop computers, laptops, tablets, smartphones, etc. running web browsers or other lightweight client applications, for example. Illustratively, the computing service 400 may be described as a "cloud" environment.

The particularly illustrated computing service 400 may include a plurality of server computers 402a-d. While four server computers are shown, any number may be used, and large data centers may include thousands of server computers. The computing service 400 may provide computing resources for executing computing instances 404a-d. Computing instances 404a-d may, for example, be virtual machines. A virtual machine may be an instance of a software implementation of a machine (i.e., a computer) that executes applications like a physical machine. In the example of a virtual machine, each of the server computers 402a-d may be configured to execute an instance manager 408a-d capable of executing the instances. The instance manager 408a-d may be a hypervisor, virtual machine monitor (VMM), or another type of program configured to enable the execution of multiple computing instances 404a-d on a single server. Additionally, each of the computing instances 404a-d may be configured to execute one or more applications.

In one aspect, the computing service 400 may include a load balancer 414 which may have the same features and capabilities of the load balancer 112 and the load balancer 204 of FIGS. 1 and 2 respectively. For example, the load balancer 414 may direct service requests from clients to the computing instances and may also track maintenance operations for the computing instances and may control when the maintenance operations are performed. One or more server computers 416 may be reserved to execute software components for managing the operation of the computing service 400 and the computing instances 404a-d.

A server computer 416 may execute a management component 418. A customer may access the management component 418 to configure various aspects of the operation of the computing instances 404a-d purchased by a customer. For example, the customer may setup computing instances 404a-d and make changes to the configuration of the computing instances 404a-d.

A deployment component 422 may be used to assist customers in the deployment of computing instances 404a-d. The deployment component 422 may have access to account information associated with the computing instances 404a-d, such as the name of an owner of the account, credit card information, country of the owner, etc. The deployment component 422 may receive a configuration from a customer that includes data describing how computing instances 404a-d may be configured. For example, the configuration may include an operating system, provide one or more applications to be installed in computing instances 404a-d, provide scripts and/or other types of code to be executed for configuring computing instances 404a-d, provide cache logic specifying how an application cache may be prepared, and other types of information. The deployment component 422 may utilize the customer-provided configuration and cache logic to configure, initialize, and launch computing instances 404a-d. The configuration, cache logic, and other information may be specified by a customer accessing the management component 418 or by providing this information directly to the deployment component 422.

Customer account information 424 may include any desired information associated with a customer of the multi-tenant environment. For example, the customer account information may include an identifier for a customer, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the computing service 400 and the server computers 402a-d, 416. The network 410 may be a local area network (LAN) and may be connected to a Wide Area Network (WAN) 412 or the Internet, so that end customers may access the computing service 400. The network topology illustrated in FIG. 4 has been simplified; many more networks and networking devices may be utilized to interconnect the various computing systems disclosed herein.

FIG. 5 is a flowchart of an example method 500 for managing maintenance operations in a distributed system according to an example of the present technology. The functionality 500 may be implemented as a method and executed as instructions on a machine, where the instructions are included on at least one computer readable medium or one non-transitory machine-readable storage medium. For example, starting in block 510, service availability of a plurality of hosts may be tracked in a service provider environment via a load balancer, wherein a host is not available during garbage collection operations. The tracking may be accomplished by the load balancer sending queries for availability checks to the hosts or the host may send messages to the load balancer.

A schedule for the garbage collection operations for the plurality of hosts may be created based on a policy that defines a predetermined amount of the plurality of hosts to be allowed to perform the garbage collection operations during a time period, as in block 520. Alternatively, the schedule may set a predefined number of hosts that are allowed to perform garbage collection at the same time.

Scheduling instructions may be sent from the load balancer to the plurality of hosts for directing the garbage collection operations of the plurality of host, as in block 530. In one configuration, the hosts may request permission from the load balancer before performing the garbage collection operations. The load balancer may notify a host of a time when the host is to perform garbage collection. The load balancer may be allocated a predetermined amount of time for the host to perform the garbage collection. In addition to garbage collection, garbage collection operations may be performed and one garbage collection operation may be to restart the host thus removing or releasing any allocated memory that is no longer connected to active processes, applications or services. Furthermore, the load balancer may track and direct clean-up operations, back up operations, logging operations, de-bugging operations, and/or tombstone operations at the hosts.

Requests may be withheld at the load balancer that are directed to a host to perform additional work during the time period that the host is scheduled to perform garbage collection operations, as in block 540. All requests may be withheld or just a fraction of the requests may be withheld. After the host has completed the garbage collection operations, the load balancer may resume sending requests to the host.

Figure 6:
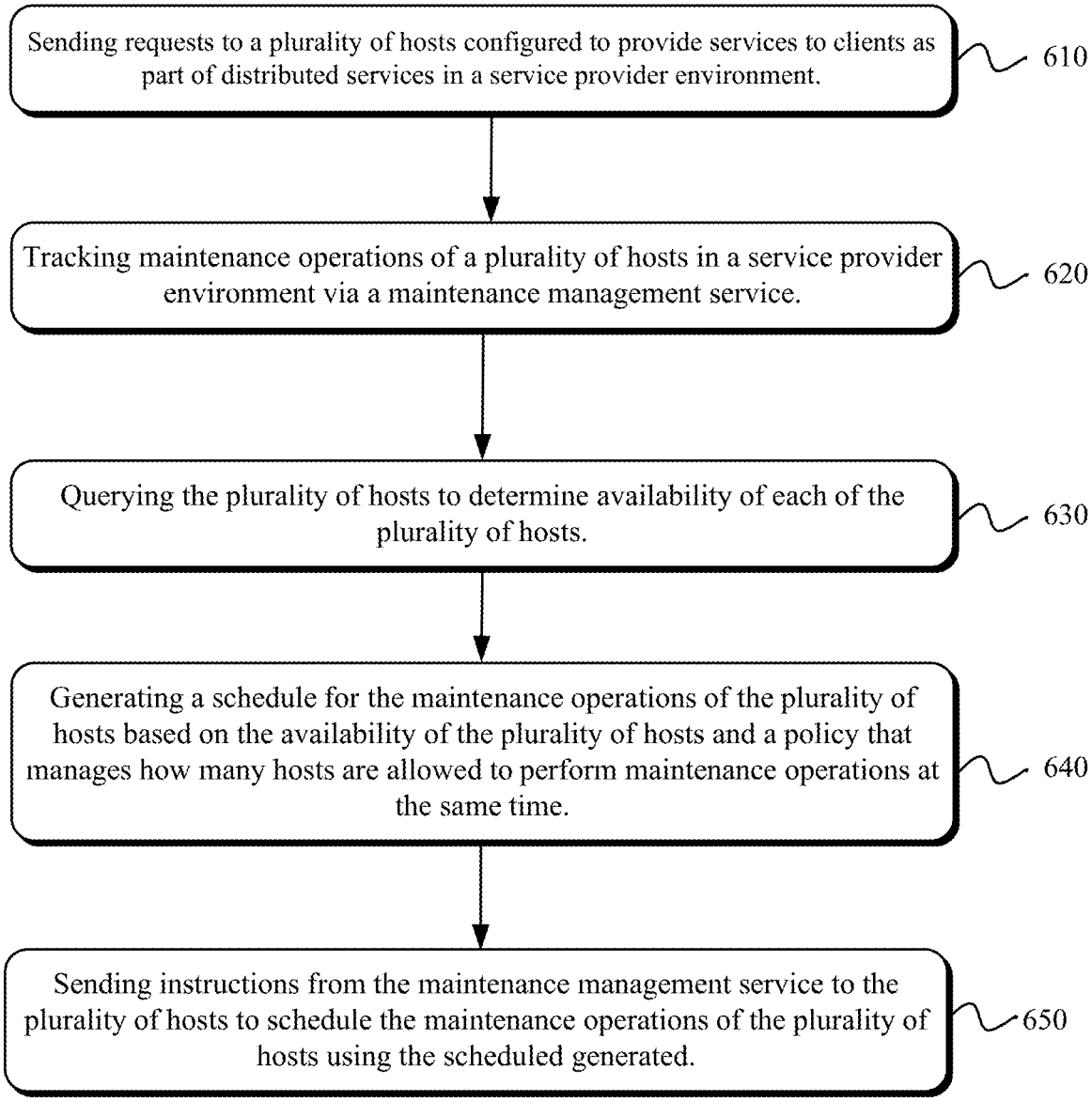

FIG. 6 is a flowchart of an example method 600 for managing maintenance operations in a distributed system according to an example of the present technology. The functionality 600 may be implemented as a method and executed as instructions on a machine, where the instructions are included on at least one computer readable medium or one non-transitory machine-readable storage medium. For example, starting in block 610, requests may be sent to a plurality of hosts configured to provide services to clients as part of distributed services in a service provider environment.

Maintenance operations of a plurality of hosts may be tracked in a service provider environment via a maintenance management service, as in block 620. The maintenance operations may include, but are not limited to garbage collection, clean-up operations, back up operations, logging operations, de-bugging operations, and/or tombstone operations. In one aspect, the maintenance operation is to restart the host in place of performing garbage collection. The maintenance operations may be for software that is executing on a host.

In one example, the load balancer may track the maintenance operations of the host by sending queries to the hosts about the status of each of the hosts. The status may be available, temporarily unavailable, unavailable, or no response which may be interpreted as unavailable. The response of temporarily unavailable may be interpreted as the host currently performing maintenance operations. During the maintenance operations the load balancer may not send new requests to the host to be serviced.

The plurality of hosts may be queried to determine the availability of each of the plurality of hosts, as in block 630. A host may respond to the query stating the host is available, unavailable or temporarily unavailable. For example, if the host is performing maintenance operations, the temporarily unavailable message may be received by the maintenance management service. During the time the host is temporarily unavailable, the load balancer may send no new service requests to the host or may send a fraction of new service requests to the host compared to what would be sent to the host.

A schedule for the maintenance operations of the plurality of hosts may be generated based on a policy that manages how many hosts are allowed to perform maintenance operations at the same time, as in block 640. The schedule may be a sequence or a queue specifying an order of when the hosts are allowed to perform maintenance operations. For example, the maintenance management service may schedule or calendar a time slot for each of the hosts to perform maintenance operations. The policy may limit the number of hosts allowed to perform maintenance operations to a predetermined percentage of the total number of hosts in the distributed system. Similarly, the policy may limit the number of hosts that are allowed to perform maintenance operations to a predetermined number of hosts such as one at a time. In addition, the policy may allocate a predetermined amount of time for a host to perform maintenance operations.

Instructions from the maintenance management service may be sent to the plurality of hosts to schedule the maintenance operations of the plurality of hosts using the scheduled generated, as in block 650.

In one aspect, directing the maintenance operations via the load balancer includes a host asking permission from the load balancer before performing maintenance operations. The load balancer may grant the permission to perform maintenance operations based on the policy and how many other hosts are currently performing maintenance operations.

Once a host has begun performing maintenance operations, the load balancer may send a message to the host to stop performing maintenance operations and come back online to receive requests. This may be based on a current need in the distributed system.

Figure 7:
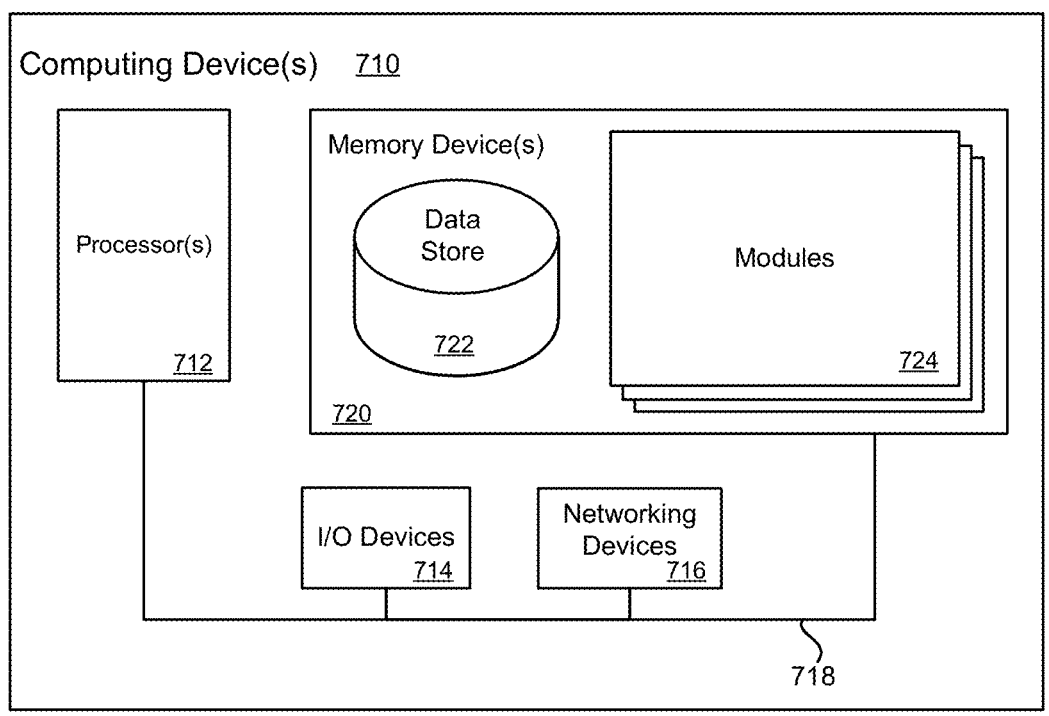
FIG. 7 is a block diagram that provides an example illustration of a computing device that may be employed in the present technology.

FIG. 7 illustrates a computing device 710 on which modules of this technology may execute. A computing device 710 is illustrated on which a high level example of the technology may be executed. The computing device 710 may include one or more processors 712 that are in communication with memory devices 720. The computing device may include a local communication interface 718 for the components in the computing device. For example, the local communication interface may be a local data bus and/or any related address or control busses as may be desired.

The memory device 720 may contain modules 724 that are executable by the processor(s) 712 and data for the modules 724. The modules 724 may execute the functions described earlier. A data store 722 may also be located in the memory device 720 for storing data related to the modules 724 and other applications along with an operating system that is executable by the processor(s) 712.

Other applications may also be stored in the memory device 720 and may be executable by the processor(s) 712. Components or modules discussed in this description that may be implemented in the form of software using high programming level languages that are compiled, interpreted or executed using a hybrid of the methods.

The computing device may also have access to I/O (input/output) devices 714 that are usable by the computing devices. An example of an I/O device is a display screen that is available to display output from the computing devices. Other known I/O device may be used with the computing device as desired. Networking devices 716 and similar communication devices may be included in the computing device. The networking devices 716 may be wired or wireless networking devices that connect to the Internet, a LAN, WAN, or other computing network.

The components or modules that are shown as being stored in the memory device 720 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor. The executable program may be stored in any portion or component of the memory device 720. For example, the memory device 720 may be random access memory (RAM), read only memory (ROM), flash memory, a solid-state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface 718 may be used as a network to facilitate communication between any of the multiple processors and multiple memories. The local interface 718 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium having instructions embodied thereon, the instructions when executed cause a processor to perform processing, comprising:
   tracking service availability of a plurality of hosts in a service provider environment via a load balancer, wherein a host is not available during garbage collection operations;
   creating a schedule for the garbage collection operations for the plurality of hosts based at least in part on a policy that defines a predetermined amount of the plurality of hosts to be allowed to perform the garbage collection operations during a time period;
   sending scheduling instructions from the load balancer to the plurality of hosts to direct the garbage collection operations of the plurality of hosts; and
   withholding requests at the load balancer that are directed to a host to perform additional work during the time period that the host is scheduled to perform garbage collection operations.

2. The non-transitory machine readable storage medium of claim 1, wherein the policy schedules a period of time for a host to be unavailable to perform the garbage collection operations.

3. The non-transitory machine readable storage medium of claim 1, wherein the load balancer tracks other maintenance operations and schedules other maintenance operations, where the other maintenance operations include back up operations, data store cleanup operations, data logging operations, and de-bugging operations.

4. The non-transitory machine readable storage medium of claim 1, wherein the load balancer queries the plurality of hosts to determine availability of each of the plurality of hosts.

5. A method, comprising:
sending requests to a plurality of hosts configured to provide services to clients as part of distributed services in a service provider environment;
tracking maintenance operations of the plurality of hosts in the service provider environment via a maintenance management service;
querying the plurality of hosts to determine availability of each of the plurality of hosts;
generating a schedule for the maintenance operations of the plurality of hosts based at least in part on the availability of the plurality of hosts and based at least in part on a policy that does not allow the plurality of hosts to perform maintenance operations during a predetermined period of time; and
sending instructions from the maintenance management service to the plurality of hosts to schedule the maintenance operations of the plurality of hosts using the schedule.

6. The method of claim 5, wherein the maintenance management service maintains a maintenance operations queue for when the plurality of hosts are allowed to perform maintenance operations.

7. The method of claim 5, wherein the maintenance management service considers a host unavailable while the host is performing maintenance operations and the maintenance management service sends no new service requests to the host during the maintenance operations.

8. The method of claim 5, wherein the policy limits a number of hosts performing maintenance operations to a predetermined percentage of a total number of the plurality of hosts.

9. The method of claim 5, wherein the policy allows a given host a predetermined amount of time to be unavailable to perform the maintenance operations.

10. The method of claim 5, wherein maintenance management service directs a first host to delay a scheduled maintenance operation based at least in part on a number of current hosts above a predetermined limit that are currently performing maintenance operations.

11. The method of claim 5, wherein the maintenance operations are garbage collection operations.

12. The method of claim 5, wherein the maintenance operations are a host restarting.

13. The method of claim 5, wherein the maintenance operations are selected from a group of maintenance operations consisting of: backup operations, data store clean-up operations, data logging operations, and de-bugging operations.

14. The method of claim 5, wherein the maintenance management service directs maintenance operations for a software application or service executing on a host.

15. The method of claim 5, further comprising: in response to the querying, the maintenance management service receives a response from the plurality of hosts regarding availability of each of the plurality of hosts.

16. The method of claim 5, wherein the maintenance management service receives a temporarily unavailable message from a host while the host is performing a maintenance operation.

17. A system, comprising:
a load balancer:
at least one processor; and
one or more memory devices including instructions to be executed by the at least one processor in order to:
direct requests for service from clients to a plurality of hosts;
track maintenance operations of the plurality of hosts;
compile scheduling data related to the maintenance operations of the plurality of hosts;
send the scheduling data regarding the plurality of hosts to each of the plurality of hosts to enable the plurality of hosts to determine when to perform maintenance operations such that the maintenance operations for each of the plurality of hosts avoid latency caused by more than a predetermined number of the plurality of hosts performing the maintenance operations simultaneously; and
withhold requests that are directed to a host to perform additional work during a time period that a host is scheduled to perform maintenance operations.

18. The system of claim 17, wherein the maintenance operations are selected from a group of maintenance operations consisting of: garbage collection operations, clean-up operations, back up operations, data logging operations, and de-bugging operations.

19. The system of claim 17, wherein each of the plurality of hosts determine when to perform the maintenance operations based at least in part on a policy that limits a number of hosts performing maintenance operations during a time period.

20. The system of claim 17, wherein the hosts communicate with one another using a peer-to-peer protocol.

* * * * *